United States Patent
Mancosu et al.

(10) Patent No.: US 7,404,317 B2
(45) Date of Patent: Jul. 29, 2008

(54) METHOD AND SYSTEM FOR DETERMINING A TYRE LOAD DURING THE RUNNING OF A VEHICLE

(75) Inventors: Federico Mancosu, Milan (IT);
Massimo Brusarosco, Milan (IT);
Daniele Arosio, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/576,604

(22) PCT Filed: Oct. 24, 2003

(86) PCT No.: PCT/EP03/50756

§ 371 (c)(1),
(2), (4) Date: May 3, 2007

(87) PCT Pub. No.: WO2005/042281

PCT Pub. Date: May 12, 2005

(65) Prior Publication Data

US 2007/0240501 A1    Oct. 18, 2007

(51) Int. Cl.
*G01M 17/02* (2006.01)
(52) U.S. Cl. .............................. 73/146; 701/1
(58) Field of Classification Search ............ 73/146; 701/1
See application file for complete search history.

(56) References Cited

U.S. PATENT DOCUMENTS

| | | | | |
|---|---|---|---|---|
| 5,458,176 A * | 10/1995 | Rhyne | .................. | 152/556 |
| 5,616,859 A * | 4/1997 | Rhyne | .................. | 73/146 |
| 5,749,984 A | 5/1998 | Frey et al. | | |
| 5,793,285 A | 8/1998 | Wehinger | | |
| 6,538,566 B1 | 3/2003 | Morand et al. | | |
| 6,729,179 B2 * | 5/2004 | Crema et al. | ............ | 73/146 |
| 2003/0037608 A1 * | 2/2003 | Crema et al. | ............ | 73/146 |
| 2003/0050743 A1 | 3/2003 | Caretta et al. | | |
| 2003/0058118 A1 * | 3/2003 | Wilson | ............ | 340/679 |
| 2007/0010928 A1 * | 1/2007 | Brusarosco et al. | ............ | 701/70 |

FOREIGN PATENT DOCUMENTS

| | | |
|---|---|---|
| EP | 0 887 211 | 12/1998 |
| EP | 1 293 362 | 3/2003 |
| WO | WO 03/016115 | 2/2003 |

* cited by examiner

*Primary Examiner*—Andre J Allen
(74) *Attorney, Agent, or Firm*—Finnegan, Henderson, Farabow, Garrett & Dunner, L.L.P.

(57) ABSTRACT

A method and system for determining a load exerted on a tyre fitted on a vehicle during the running of the vehicle on a rolling surface. The tire has an equatorial plane. A concave upward function $F_z=F_z(PL_c)$ of the tire load versus the length of a contact region is provided between the tire and the rolling surface. The length ($PL_c$) is estimated substantially at the equatorial plane and the tire load corresponding to said estimated length is derived from the function.

38 Claims, 6 Drawing Sheets

METHOD AND SYSTEM FOR DETERMINING A TYRE LOAD DURING THE RUNNING OF A VEHICLE

CROSS REFERENCE TO RELATED APPLICATION

This application is a national phase application based on PCT/EP2003/050756, filed Oct. 24, 2003, the content of which is incorporated herein by reference.

BACKGROUND OF THE INVENTION

1. Field of the Invention

The present invention relates to a method and a system for determining a vertical load to which a tyre mounted on a vehicle is subjected, during running of the vehicle.

2. Description of the Related Art

Inflation pressure is a convenient measurement to make on a tyre fitted on a vehicle wheel and it is becoming a standard by which tyres are monitored. Tyre load, i.e., the supported weight, is a more difficult measurement but, unlike pressure, is a direct measurement of tyre stress. Tyres are selected for a particular vehicle based on the physical strength of their structure and/or material, as well as on the normal range of vehicle weight that they should support at specified nominal temperature and pressure. If the vehicle applies a load to a tyre in excess of the load range for which the tyre has been designed, the tyre is subjected to excessive stress and may fail or have its expected lifetime shortened.

Furthermore, it has to be considered that tyre maintenance is mainly based on the duty, by the vehicle driver, of maintaining tyre pressure near a nominal value, defined by the vehicle and tyre manufacturers. Although it is well known by the tyre industry that the requisite pressure is dependent on the supported load, this load-dependent pressure information is not provided to the driver, since real-time load is unknown. As a result, should the load vary from that assumed by the manufacturer, the tyres may be improperly inflated. Since the requisite pressure increases with load, the only option left is to assume the maximum load and specify a pressure accordingly. However, this maximum pressure can: 1) give a very hard ride; 2) reduce the tyre-to-road contact area available for braking; 3) wear out the center of the tyre tread prematurely. Thus, tyre load information is needed to properly inflate tyres.

Moreover, vehicle electronic control systems, such as for example a vehicle brake control system, a traction control system, an anti-lock braking system, an electronic braking system, a steering control system, an active roll control system, a vehicle stability control system, may use information related to the tyre load, in order to control actuators that move, control and stop the vehicle.

This tyre information may be used within the vehicle, or it can be used remotely, i.e. outside the vehicle. As the telematic capability of vehicles increases, they are capable of wirelessly communicating with a remote facility for monitoring the vehicle health (diagnostics), for prediction of maintenance (prognostics), and to monitor the vehicle as it passes on the road. The information may be also historically important to understand the cause of accidents.

U.S. Pat. No. 5,793,285 discloses a method and apparatus for monitoring tyres on a vehicle, by continuously measuring the distance between the associated vehicle axle (or a vehicle body part rigidly connected thereto) and the road, while the vehicle is in operation. From this measurement, the tyre deflection is determined. According to the authors, the measured tyre deflection represents a comparatively exact measure of the respective tyre load. When the tyre deflection determined leaves a predetermined desired range, a warning signal is transmitted.

PCT patent application no. WO 03/016115 discloses a method for determining the charge or load exerted on a tyre of a motor vehicle and/or for monitoring tyre pressure, wherein the pressure in each tyre is detected during operation of the vehicle and the rotational behavior of the individual wheels is observed. Load distribution parameters are also determined by comparing the rotational behavior and/or changes in said rotational behavior of the individual wheels during given driving states, taking into account preset and/or predetermined and/or learned variables. Tyre pressure and load distribution parameters are used to determine the load or charge exerted on the tyres and/or pressure loss. In one example, a pressure-measuring system based on the use of pressure sensors (such as TPMS=Tyre Pressure Measuring System), is used to determine the tyre pressure, whilst characteristic variables representing the load distribution are determined using a system based on an evaluation of wheel speed data operating in the manner of a system (Deflation Detecting System=DDS) used to determine conditions relating to the dynamic rolling circumferences of the individual tyres. Consequently, the function of detecting capacity utilization can be set up using existing systems. In another example, the number of revolutions of a front wheel is compared with the number of revolutions of a rear wheel at the same vehicle speed or at approximately the same vehicle speed (e.g. vehicle reference speed), evaluated to obtain a load distribution characteristic variable, and the value and/or the change in the load distribution characteristic variables in defined driving situations is/are used as a means of calculating the capacity utilization or load of the tyres and/or the pressure loss.

U.S. patent application no. 2003/0058118 discloses a vehicle and vehicle tyre monitoring system, apparatus and method for determining the load-induced deflection or deformation of a vehicle tyre. Based thereon, deflection-related information, such as tyre load, molar air content, total vehicle mass and distribution of vehicle mass, are provided. The tyre deflection region or contact region of the loaded tyre is detected by sensing the acceleration of the rotating tyre by means of an accelerometer mounted on the tyre, preferably on an inner surface such as the tread lining thereof. As the tyre rotates and the accelerometer is off of the contact region, a high centrifugal acceleration is sensed. Conversely, when the accelerometer is on the contact region and not rotating, a low acceleration is sensed. The deflection points delimiting the contact region are determined at the points where the sensed acceleration transitions between the high and low values. From a measurement of the rotation rate of the tyre, of the time between detections of the deflection points and from the tyre radius, the contact length (contactLength) can be determined. In order to determine the tyre load, the following formula is suggested:

$$\text{load} = a \times \text{treadWidth} \times \text{contactLength} \times \text{pressure} + \text{forceSidewall}$$

where treadWidth is the width of the tread, treadWidth× contactLength is the area of applied pressure, forceSidewall is the effective resiliency of the tyre sidewall to collapse, and $a$ is a proportionality constant near to 1. Alternatively, the load can be determined from a disclosed relationship between air moles, pressure, temperature and contact length, derived from the Ideal Gas Law.

According to the Applicant, the methods disclosed in the above U.S. Pat. No. 5,793,285 and in the above PCT patent application no. WO 03/016115 may not give reliable real-time determinations of the tyre load, since they are not based on measurements performed directly on the tyre. Thus, they may suffer from an "averaging effect", which can cause a loss of important tyre load data, especially in rapidly varying conditions.

On the other hand, the approach disclosed in the above US patent application no. 2003/0058118 is quite theoretical and could not fit with a complex system such as a tyre. For example, considering the rectangle treadWidth×contactLength as the area of applied pressure is a strong approximation, as the contact area between the tyre tread and the road is quite different from a rectangle. Furthermore, the value forceSidewall is generally not determined with high precision, so that a further approximation would be included in the tyre load determination.

U.S. Pat. No. 6,538,566 describes a process for the in-service monitoring of the condition of a tire of a wheel riding on a ground, the tire having a tread, the process comprising the steps of: providing in the tire, near the tread, a miniature sensor for sensing radial acceleration; monitoring the variations in the measurement from the sensor; detecting a decrease in the radial acceleration, said decrease corresponding to a zone of the tread in contact with the ground; and measuring a period of low radial acceleration phases and a fraction of this period during which the radial acceleration is low, said fraction within each period being related to a length of said zone where the tread is in contact with the ground, and thereby to the condition of the tire.

EP-0 887 211 relates to pneumatic tires for vehicles and in particular to a system for monitoring tires by monitoring their deflection. The system comprises: a sensor device operatively arranged with respect to the tire to create an electrical pulse during the footprint pass corresponding to a deformation of the tire; means for calculating a ratio of the duration of said electrical pulse to the duration of one tire revolution; means for transmitting said ratio to an evaluating unit placed in the vehicle; wherein said sensor device is placed within the tread area of said tire in order that said electrical pulse presents a first maximum at the entrance and a second maximum at the leaving of said footprint pass.

SUMMARY OF THE INVENTION

The Applicant has faced the problem of determining in real-time, i.e. during the running of the vehicle, and in a reliable way, the load to which a tyre fitted on the vehicle is subjected.

In a first aspect, the invention relates to a method for determining a load exerted on a tyre fitted on a vehicle during a running of said vehicle on a rolling surface, the tyre comprising an equatorial plane, the method comprising the steps of: providing a concave upwards function $F_z=F_z(PL_c)$ of said tyre load versus a length of a contact region between said tyre and said rolling surface; estimating said length substantially at the equatorial plane; and deriving the tyre load corresponding to said estimated length from said function.

Preferably, said function is a polynomial function of degree at least two of said length.

Preferably said function is $$F_z = \frac{-B + \sqrt{B^2 - 4A(C - PL_c)}}{2A},$$

wherein A, B and C are fit coefficients related to a structure of said tyre. Alternatively, said function is $F_z=A1 \cdot \tan(B1 \cdot PL_c)$, wherein A1 and B1 are fit coefficients related to a structure of said tyre.

Profitably, said step of estimating said length comprises the step of acquiring an acceleration signal.

Preferably, the method further comprises a step of low-pass filtering said acceleration signal.

Preferably, said step of acquiring an acceleration signal comprises acquiring a tangential acceleration signal and the step of estimating said length comprises measuring a distance between a maximum value and a minimum value of said tangential acceleration signal.

Alternatively, said step of acquiring an acceleration signal comprises acquiring a radial acceleration signal and the step of estimating said length comprises measuring a distance between two maxima of said radial acceleration signal.

In a second aspect, the invention relates to a method of controlling a vehicle having at least one tyre fitted thereon, comprising: estimating a load exerted on said tyre by a method as set forth above; passing said estimated load to a vehicle control system of the vehicle; adjusting at least one parameter in said vehicle control system based on said estimated load.

The vehicle control system may comprise a brake control system, and said step of adjusting at least one parameter may comprise adjusting a braking force on said tyre.

Alternatively or in combination, the vehicle control system may comprise a steering control system, and said step of adjusting at least one parameter may comprise selecting a maximum variation allowed from steering commands.

Alternatively or in combination, the vehicle control system may comprise a suspension control system, and said step of adjusting at least one parameter may comprise adjusting a stiffness of a suspension spring associated to said tyre.

Typically, the vehicle comprises at least one tyre fitted on its right and at least one tyre fitted on its left. Alternatively to or in combination with the previous embodiments, the vehicle control system may comprise an active roll control system, and said step of adjusting at least one parameter comprises compensating an unequal load distribution between said left fitted tyre and said right fitted tyre.

In a third aspect, the invention relates to a system for determining a load exerted on a tyre fitted on a vehicle during a running of said vehicle on a rolling surface, the system comprising: a measuring device adapted to estimate a length of a contact region between said tyre and said rolling surface substantially at the equatorial plane; and at least one processing unit being adapted to derive the tyre load corresponding to said estimated length from a concave upwards function $F_z=F_z(PL_c)$ of said tyre load versus the length of contact region between said tyre and said rolling surface.

Preferably, said function is a polynomial function of degree at least two of said length.

Preferably said function is $$F_z = \frac{-B + \sqrt{B^2 - 4A(C - PL_c)}}{2A},$$

wherein A, B and C are fit coefficients related to the structure of said tyre. Alternatively, said function is $F_z=A1 \cdot \tan(B1 \cdot PL_c)$, wherein A1 and B1 are fit coefficients related to a structure of said tyre.

Profitably, said measuring device comprises a tangential or a radial accelerometers producing a corresponding acceleration signal.

Preferably, said measuring device comprises a sampling device adapted to sample said signal at a frequency of at least 5 kHz. More preferably, said sampling device is adapted to sample said signal at a frequency of at least 7 kHz.

Preferably, the system comprises at least one memory associated to said processing unit.

Preferably, said at least one memory comprises pre-stored characteristic functions describing vertical tyre loads versus contact region lengths. Typically, said at least one memory comprises pre-stored instructions for said processing unit.

Preferably, said measuring device is included in a sensor device located in a tread area portion of said tyre.

Preferably, said sensor device is secured to an inner liner of the tyre and comprises a damping element between said sensor and said inner liner.

Preferably, said sensor device further includes a transmitting device and said transmitting device is operatively connected to a first antenna.

BRIEF DESCRIPTION OF THE DRAWINGS

Further features and advantages of the present invention will be better illustrated by the following detailed description of an example thereof, herein given with reference to the enclosed drawings, in which.

DETAILED DESCRIPTION OF THE INVENTION

Figure 1:
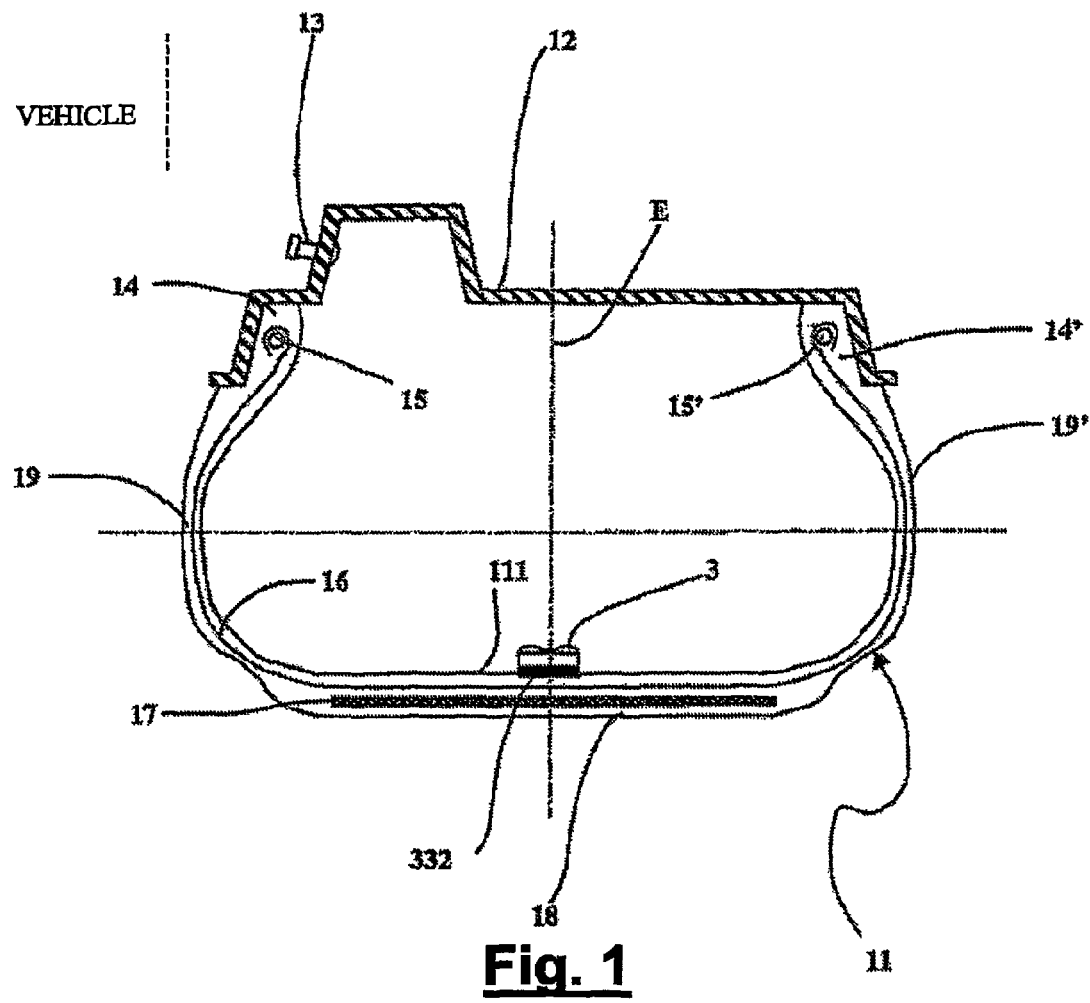
FIG. 1 shows a cross section of a tyre including a sensor device, according to a preferred embodiment of the invention.

FIG. 1 shows a cross section of a wheel comprising a tyre 11 and a supporting rim 12. The tyre 11 shown in FIG. 1 is of a type conventionally known as "tubeless", i.e. it does not include an inner tube. This tyre can be inflated by means of an inflation valve 13 positioned, for example, on the channel of the said rim 12. The tyre is fitted on a vehicle (not shown).

The tyre 11 includes a carcass 16, terminating in two beads 14 and 14', each formed along an inner circumferential edge of the carcass 16, for fixing the tyre 11 to the corresponding supporting rim 12. The beads 14, 14' comprise respective reinforcing annular cores 15 and 15', known as bead cores. The carcass 16 is formed by at least one reinforcing ply, including textile or metallic cords, extending axially from one bead 14 to the other 14' in a toroidal profile, and having its ends associated with a respective bead core 15 and 15'. In tyres of the type known as radial, the aforesaid cords lie essentially in planes containing the axis of rotation of the tyre. An annular structure 17, known as belt structure, is placed in a radially external position with respect to the carcass 16. Typically, the belt structure 17 includes one or more strips of elastomeric material incorporating metal and/or textile cords, overlapping with each other. A tread band 18 of elastomeric material is wound around the belt structure 17 and impressed with a relief pattern for the rolling contact of the tyre with the ground. Two sidewalls 19 and 19' of elastomeric material, each extending radially outwards from the outer edge of the corresponding bead 14 and 14', are also placed on the carcass 16 in axially opposed lateral positions. In tubeless tyres the inner surface of the carcass 16 is normally covered with a liner 111, i.e. with one or more layers of air-impermeable elastomeric material. Other known elements, such as for example bead fillers may be provided, according to the specific design of the tyre 11.

A sensor device 3, that will be described in detail in the remainder of the description, is associated with the tyre 11. The sensor device 3 may be profitably located in a portion of the tread area of the tyre 11, i.e. the region of the tyre 11 axially extended between the sidewalls of the tyre 11. The sensor device 3 is substantially at the equatorial plane E of the tyre.

The sensor device 3 is preferably secured to the inner liner 111 of the tyre 11. A fixing element 332 adheres both to the sensor device 3 and to the inner liner 11. Suitable materials for the fixing element 332 may include generally flexible rubbers, such as for example natural rubber, or synthetic rubber, e.g. rubbers made from conjugated dienes having from 4 to 10 carbon atoms such as poly-isoprene, polybutadiene, styrene-butadiene rubber and the like. In preferred embodiments, a material included in the fixing element 332 should have a damping effect, in order to secure the fixing of the central sensor device 3 to the inner surface of the tyre by minimizing the mechanical stresses exerted onto the fixing surface during use of the tyre 11. Furthermore, a damping material reduces the probability of damages to the sensor device 3 by preventing transmission of the above stresses to the device. Suitable damping materials may have a Shore A hardness (measured at 23° C. according to ASTM Standard D2240) of from about 1 to about 40, and an elastic rebound (measured at 23° C. according to ASTM Standard D1054) lower than about 60. Cross-linked diene elastomers or polyurethane gel materials may be adapted in order to fit with these damping specifications. For improved adhesion between the sensor device 3 and the liner 111, it may be advantageous to interpose a further adhesive element, for example a double-sided adhesive film, between the fixing element 332 and the inner surface of the liner 111 and/or between the fixing element 332 and the sensor device 3. An appropriate double-sided adhesive film may be the Scotch® 300SL HI Strength, marketed by 3M. In alternative embodiments, the sensor device 3 may be incorporated within the structure of the tyre in the tread area, for example within the tread band, or between the outer belt strip and the tread band.

In a preferred embodiment of the present invention (not shown), several sensor devices may be disposed within the tyre 11 substantially at the equatorial plane, in circumferential positions spaced one from each other, preferably of substantially the same angle. For example, three sensor devices may be located within the tyre, circumferentially spaced from each other of an angle of substantially 120°. The use of several sensor devices disposed in circumferentially spaced positions within the tyre allows to achieve more accuracy and reliability of the measurements performed, as well as a better monitoring of the tyre load during the entire wheel turn.

The sensor device 3 is adapted to communicate with a unit external to the tyre 11. Such external unit will be referred in the following as "fixed" unit. The fixed unit may be located on the vehicle on which the tyre 11 is fitted.

Figure 2:
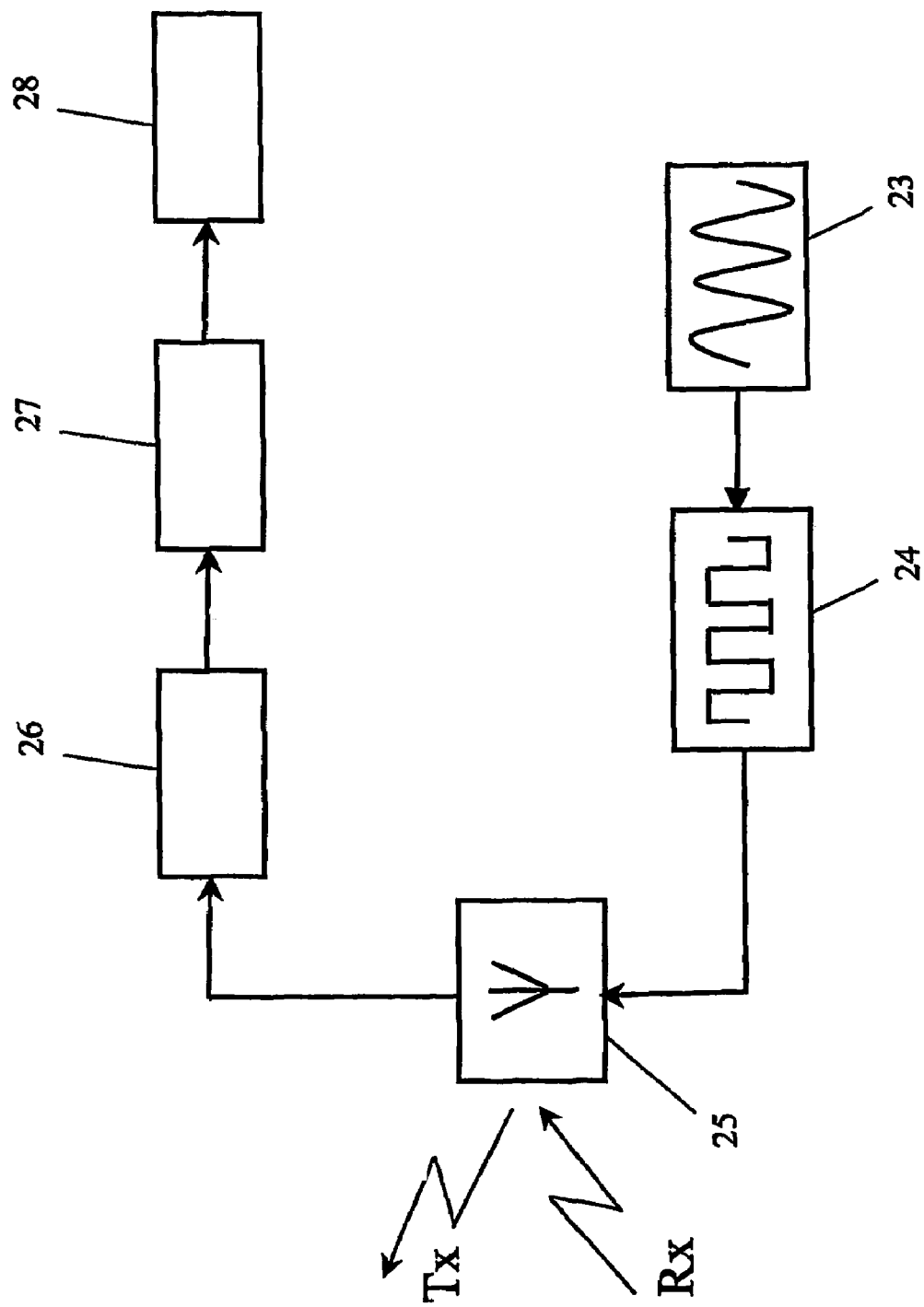
FIG. 2 shows a diagram of an embodiment of fixed unit included in a system according to the invention.

For example, FIG. 2 shows a block diagram of a fixed unit 2, comprising a device for receiving from the sensor device 3 included within the tyre 11. Preferably, the fixed unit 2 also comprises a device for transmitting to said sensor device 3. The receiving device may comprise a radio-frequency receiver 26 connected to a first antenna 25, referred to below as the "fixed antenna". Preferably, the receiving device also comprises an electrical demodulator device 27. A memory 28, such as for example an EPROM, can store the data received by the sensor device 3 and demodulated by the demodulator 27. In preferred embodiments, the memory 28 is associated to a central processing unit (CPU, not shown in FIG. 2), in order to perform calculations from the data received by the sensor device 3 and/or stored in the memory 28. The memory 28 may also store historical logs, for example of measures of vehicle instability, or of steps the control system has taken to control the vehicle, or of alarms displayed to the vehicle driver, or of excessive loads. The transmission device preferably comprises an oscillator circuit 23, which supplies a driver circuit 24 for the fixed antenna 25. If the fixed unit 2 is located on the vehicle, the electrical energy required to power the fixed unit 2 can be supplied directly by the vehicle battery.

Figure 3:
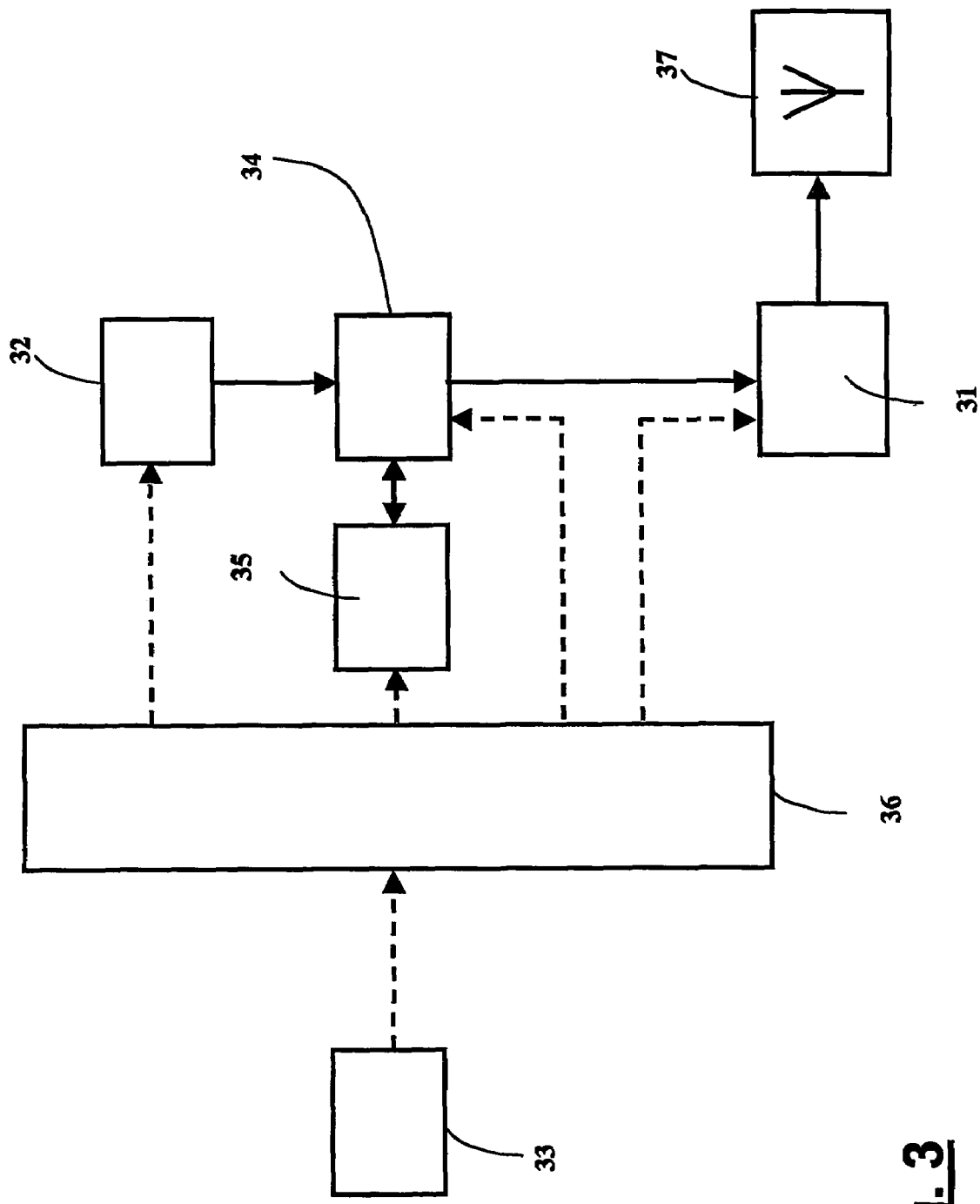
FIG. 3 shows a diagram of an embodiment of sensor device included in a tyre according to the invention.

The sensor device 3, an exemplary block diagram of which is shown in FIG. 3, comprises in general terms a device 31 for data transmission to the said fixed unit and a measuring device 32 adapted to estimate a length of the contact region between the tyre 11 and the road (more generally, the rolling surface). The measuring device may preferably comprise a radial and/or tangential accelerometer. Such accelerometer should be capable of supporting and correctly measuring very high acceleration values, as both the radial and tangential accelerations (in particular the radial acceleration) supported by the tread area of the tyre may reach, at high speed, values of 500-1000 g, wherein g is the gravity acceleration. In an alternative embodiment, the measuring device may comprise an extensometer, whose output signal gives a measure of the flexion of the monitored tread area portion. For the purpose of measuring the contact patch length, the measuring device 32 acquires a signal representative of the deformation to which the tread area portion corresponding to the position of the sensor device 3 is subjected. In order to perform a real-time determination of the tyre load, the signal should be acquired with high precision. For this purpose, and taking into account the frequency rotation of a rolling tyre (particularly at high speed), the measuring device 32 preferably includes a sampling device (not shown) capable of enabling the reading of the radial deformation signal at a frequency of at least 5 kHz, more preferably at a frequency of at least 7 kHz, so as to furnish a sampled signal thereof. In preferred embodiments, the measuring device 32 may also include a pressure sensor and/or a temperature sensor. However, pressure or temperature measurements do not need a high frequency sampling. In alternative embodiments a pressure and/or a temperature sensor may be disposed externally of the sensor device 3, e.g. It may be located within the tyre valve. The sensor device 3 typically includes also an antenna 37, referred to below as the "mobile antenna", operatively connected to said transmission device 31, for data transmission to the fixed antenna of the fixed unit. Transmission from the mobile antenna to the fixed antenna may occur at conventional telemetry radio-frequencies, e.g. In a band comprised between 400 and 450 MHz (for example at 418 MHz or 433 MHz).

The sensor device 3 may further include a processing unit (CPU) 34, associated to a memory device 35. This memory device 35 may contain re-writable memory locations in which information about the measurements taken by the measuring device 32 can be stored. Furthermore, it may also contain pre-stored instructions for the processing unit 34, suitable for pre-processing the signals coming from the measuring unit 32 before transmission, in order to reduce the amount of information sent out of the tyre 11. More particularly, the deformation signal may be pre-processed in order to detect characteristic points, such as for example maxima and minima, the coordinates of which can be sent to the transmission device 31 for transmission to the fixed unit. This results in saving transmission bandwidth and required power for transmission. Furthermore, a filtering device (not shown) may be interposed between the measuring unit 32 and the processing unit 34, in order to low-pass filter the deformation signal and discriminate the useful signal from high-frequency noise caused by the interaction between the tread band and the road. However, such filtering may be provided by electronics included within the measuring device 32 or as further pre-processing instruction stored within the memory 35.

A power source 33 allows to energize the sensor device. The power source 33 may include a battery. However, for a real-time determination of the tyre tyre load, a great electrical power consumption may be requested by the measuring device 32 (in particular by a high frequency sampling device), by the processing unit 34 and by the transmission device 31, so that a battery could have short lifetime, as compared to the entire life of the tyre. Thus, in preferred embodiments, the power source 33 includes a self-powering device, which generates electricity as a result of the mechanical stresses to which said self-powering device is subjected (for example, centrifugal force, or the deformations of the liner, or movements due to travelling on uneven roads). As an example, piezoelectric materials may be used in the self-powering device for such purpose. The self-powering device also includes an electrical energy storage circuit (not shown), typically including a resistor and a capacitor. As a further alternative, the sensor device 3 may be energized by the fixed unit by means of a suitable receiving device (not shown), connected to the mobile antenna 31.

A device for distributing the electrical power 36 preferably distributes appropriately the electrical power provided by the power source 33 to said processing unit 34, to said memory device 35, to said device for transmitting 31 and to said measuring device 32, according to their requirements.

It has to be noticed that it is not necessary to include the measuring device, the transmission portion to the fixed unit and the control electronics within a single packaged sensor device. For example, the control electronics and the transmission portion to the fixed unit could be packaged in a separated device secured to other parts of the tyre or of the wheel (e.g. the rim, or the sidewall), associated by a wired or wireless (e.g. optical or by radio-frequency) connection to a measuring device located in the tread area portion of the tyre. Furthermore, it should be remarked that the patch length could be measured by any device or method suitable for the purpose, not necessarily by using an accelerometer sensor device. The accelerometer arrangement that has been described in detail is Just one of a number of possible arrangements.

Figure 4:
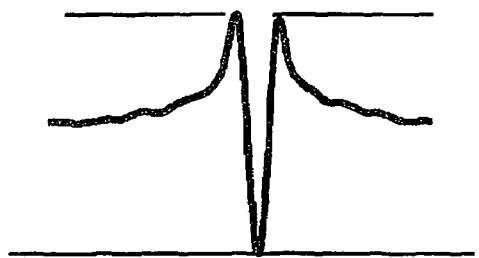
FIG. 4 shows a portion of an exemplifying radial acceleration curve obtained after filtering a radial acceleration signal.

FIG. 4 shows, by way of example, a portion of a typical radial acceleration curve obtained by a sensor device including a radial accelerometer secured to the inner liner of a tyre, after a sampling and a filtering of the corresponding acceleration signal. It should be noticed that, at the passage under the contact patch, the level of radial centrifugal acceleration sensed by the accelerometer increases abruptly a first time, then drops to until substantially zero, and then increases abruptly a second time. In other positions the radial acceleration sensed by the accelerometer has an average level related to the rotation speed of the rolling tyre: the higher the speed, the higher the sensed acceleration.

The curve of FIG. 4 shows that when the tread area portion corresponding to the position of a sensing device begins and ends its passage under the contact patch, such tread area portion is subjected to a strong radial deformation (corresponding to the peaks shown in the curve), whereas in other positions such tread area portion is not practically subjected to deformations (corresponding to a substantially constant acceleration value outside from the contact patch). The distance between the two maxima of the radial acceleration signal is indicative of the contact patch length PL.

Figure 5:
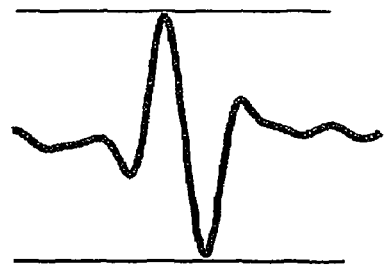
FIG. 5 shows a portion of an exemplifying tangential acceleration curve obtained after filtering a tangential acceleration signal.

FIG. 5 shows, by way of example, a portion of a tangential acceleration curve obtained by a sensor device including a tangential accelerometer secured to the inner liner of a tyre, after sampling the corresponding acceleration signal. The tangential acceleration is reported in ordinate. It should be noticed that, at the passage under the contact patch, the level of tangential acceleration sensed by the accelerometer increases abruptly a first time, then drops to a negative value, and then increases abruptly a second time. In other positions the tangential acceleration sensed by the accelerometer has an average level of substantially zero, if the tyre is rolling at a constant speed. The curve of FIG. 5 shows that when the tread area portion corresponding to the position of the accelerometer begins and ends its passage under the contact patch, such tread area portion is subjected to a strong tangential deformation (corresponding to the maximum and minimum shown in the curve), whereas in other positions such tread area portion is not practically subjected to deformations (corresponding to the substantially zero tangential acceleration value outside from the contact patch).

The distance between the maxima of the radial acceleration signal or between the maximum and the minimum values of the tangential acceleration signal is thus indicative of the contact patch length PL. More particularly, PL can be advantageously calculated by radial or tangential acceleration signals by the following formula:

$$PL = \omega_i \cdot r_r \cdot np_i \cdot 1/f_s$$

Wherein:
$f_s$: sampling frequency of the acceleration signal;
$r_r$: free rolling radius of the tyre;
$np_i$: number of measured points between the two maxima of the radial or between the maximum and the minimum of the tangential acceleration signal; and
$\omega_i$: tyre instantaneous rotation speed.

The instantaneous angular rotation speed of the tyre can be calculated from a radial acceleration signal by $\sqrt{(a_i/r_r)}$ wherein $a_i$ is the average radial acceleration calculated before or after entering the contact area with the rolling surface (i.e., using a portion of the radial acceleration signal outside from the peaks shown in FIG. 4).

In a preferred embodiment, using a plurality of sensor devices located within the tyre at different circumferential positions, a first sensor device located outside the contact patch could be used in order to measure the average radial acceleration level $a_i$ (and derive the instantaneous rotation speed of the tyre), in real-time, in the same time interval in which a second sensor device passes under the contact patch. Simple control electronics can be implemented within the sensor devices in order to trigger the needed measurements. The needed algorithms for the above described analysis of the signal generated by the accelerometer can also be stored within the memory of the sensor device, in order to be used by the associated processing unit.

It has to be noticed that other methods or formulas could be used for the purpose of estimating the contact patch length.

Figure 6:
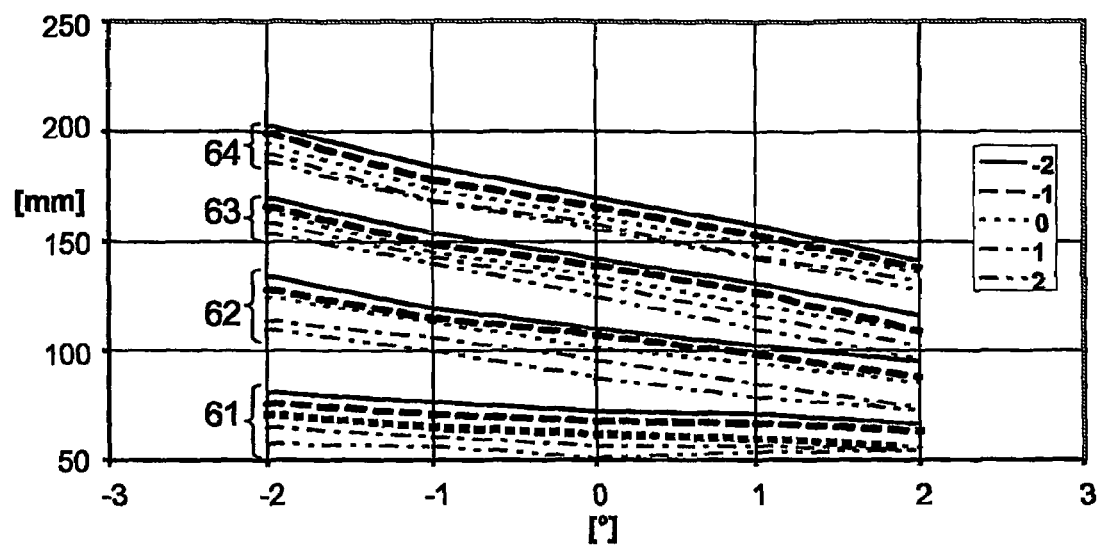
FIG. 6 shows a plot carrying curves of contact patch lengths measured by an internal accelerometer versus cornering angle.

In order to explain the principles of the invention, the results of tests performed by the Applicant using a tyre "Pirelli® P6® 195/65R15" will be described in the following. More particularly, the Applicant has performed a number of measurements in different cornering conditions of the tyre in order to understand how the contact patch length measurement could be influenced by a manoeuvre performed by a vehicle. In a first series of tests, the Applicant has measured different values of an "internal" contact patch length $PL_i$, namely the contact patch length measured by a tangential accelerometer located at a distance from the equatorial plane of the tyre, in a portion of the tread area closer to the vehicle (internal accelerometer). The internal contact length $PL_i$ was evaluated using different cornering angles, different tyre loads and at nominal inflation pressure. Furthermore, for each tyre load, a number of camber angles (−2°, −1°, 0°, +1°, +2°) has been set. FIG. 6 shows the resulting plot, carrying curves of patch length measured by the internal accelerometer (ordinate) versus cornering angle (abscissa) for different tyre loads at a constant speed of 40 Km/h, with the following tyre load values: curves 61 correspond to a tyre load of 2000 N; curves 62 to a tyre load of 3500 N; curves 63 to a tyre load of 5000 N and curves 64 to a tyre load of 6500 N. For each tyre load, curves corresponding to different camber angles (+2°, +1°, 0°, −1° and −2°) have been indicated by different lines. As it can be seen, the contact length $PL_i$, measured by an internal accelerometer, strongly depends on the tyre load but also on the camber angle and on the cornering conditions of the tyre.

Thus, the tyre load can hardly be derived from a simple measurement of the internal contact patch length $PL_i$.

Figure 7:
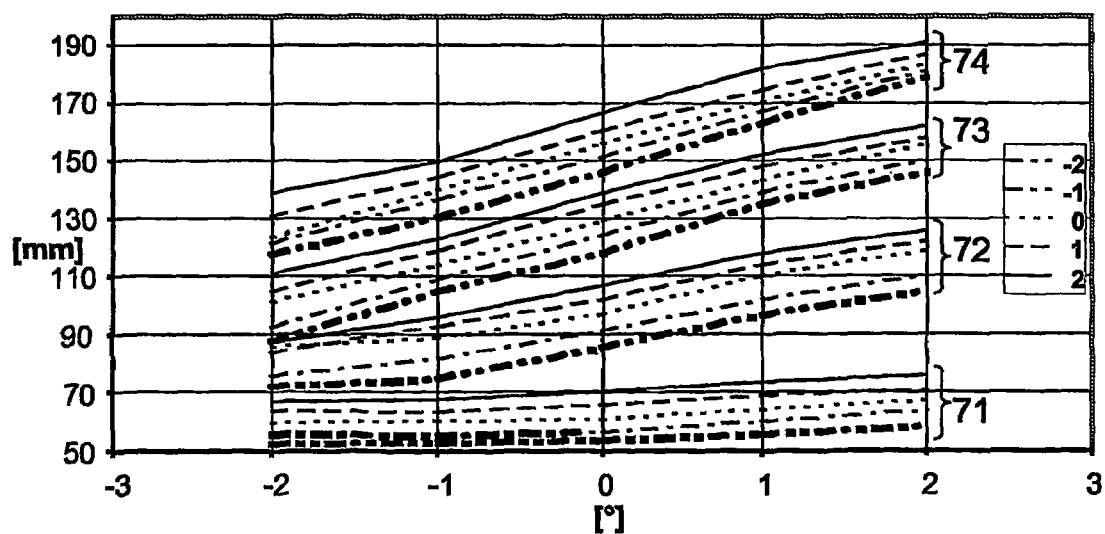
FIG. 7 shows a plot carrying curves of patch lengths measured by an external accelerometer versus cornering angle.

In a second series of tests, the Applicant has measured an "external" contact patch length $PL_e$, namely the contact patch length measured by a tangential accelerometer located at a distance from the equatorial plane of the tyre, in a portion of the tread area farther from the vehicle (external accelerometer). The external contact length $PL_e$ was evaluated using different cornering angles, different tyre loads, at nominal inflation pressure. For each tyre load, a number of camber angles (−2°, −1°, 0°, +1°, +2°) has been set. FIG. 7 shows the resulting plot, carrying curves of patch length measured by the external accelerometer (ordinate) versus cornering angle (abscissa) for different tyre loads at a constant speed of 40 Km/h, with the same tyre load values as above. Curves 71 correspond to a tyre load of 2000 N; curves 72 to a tyre load of 3500 N; curves 73 to a tyre load of 5000 N and curves 74 to a tyre load of 6500 N. For each tyre load, curves corresponding to different camber angles (+2°, +1°, 0°, −1° and −2°) have been indicated by different lines. As it can be seen in FIG. 7, a result similar to that shown in FIG. 6 is obtained, so that the tyre load can hardly be derived from a simple measurement of the external contact patch length $PL_e$.

Figure 8:
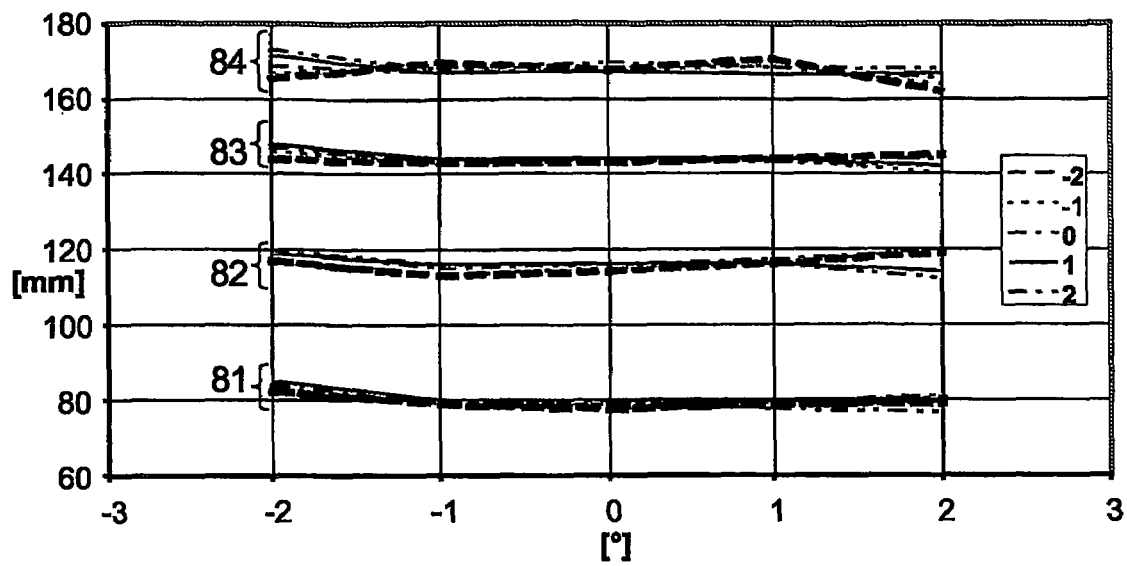
FIG. 8 shows a plot carrying curves of patch lengths measured by a central accelerometer versus cornering angle.

In a third series of tests, the Applicant has measured a "central" contact patch length $PL_c$, namely the contact patch length measured by a tangential accelerometer located at the equatorial plane of the tyre (central accelerometer). The central contact length $PL_c$ was evaluated using different cornering angles, different tyre loads and at nominal inflation pressure. Furthermore, for each tyre load, a number of camber angles (−2°, −1°, 0°, +1°, +2°) has been set. FIG. 8 shows the resulting plot, carrying curves of central patch length measured by the central accelerometer (ordinate) versus cornering angle (abscissa) for different tyre loads at a constant speed of 40 Km/h, with the same tyre load values as above: curves 81 correspond to a tyre load of 2000 N; curves 82 to a tyre load of 3500 N; curves 83 to a tyre load of 5000 N and curves 84 to a tyre load of 6500 N. For each tyre load, curves corresponding to different camber angles (+2°, +1°, 0°, −1° and −2°) have been indicated by different lines. Surprisingly, as it can be seen, the central contact patch length $PL_c$, measured at the equatorial plane of the tyre, substantially does not depend on the camber angle. Furthermore, still surprisingly, the central contact patch length $PL_C$ negligibly depends on the cornering angle. In other words, the patch length measured at the tyre centre only varies as a function of the tyre load. A further consideration is about non-proportionality of the "patch length/tyre load" relation. In fact, the distance between the curves relating to 2000 N and those relating to 3500 N is higher than the one between 3500 N and 5000 N.

Figure 9:
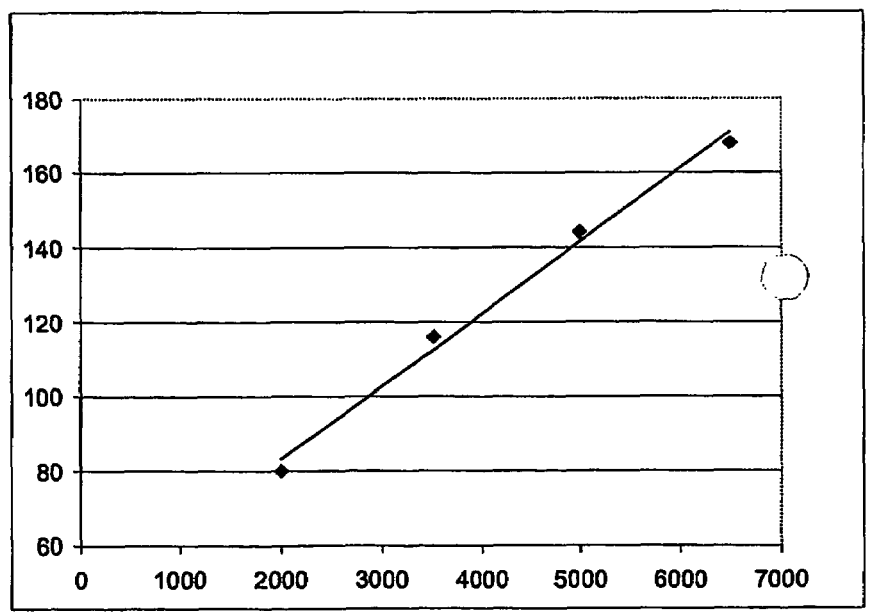
FIG. 9 shows a straight line interpolating experimental data of contact patch length, measured by a central accelerometer, versus tyre load.

The Applicant has plotted in a graph the average values of the experimentally obtained contact lengths for each tyre load. FIG. 9 shows the obtained points in a plot of contact patch length versus tyre load, together with a fitting straight line: as it can be seen, the straight line does not fit very well the data. On the contrary, the Applicant has found that a fitting straight line could result in significant errors in the estimation of the tyre load from the central contact patch length.

Figure 10:
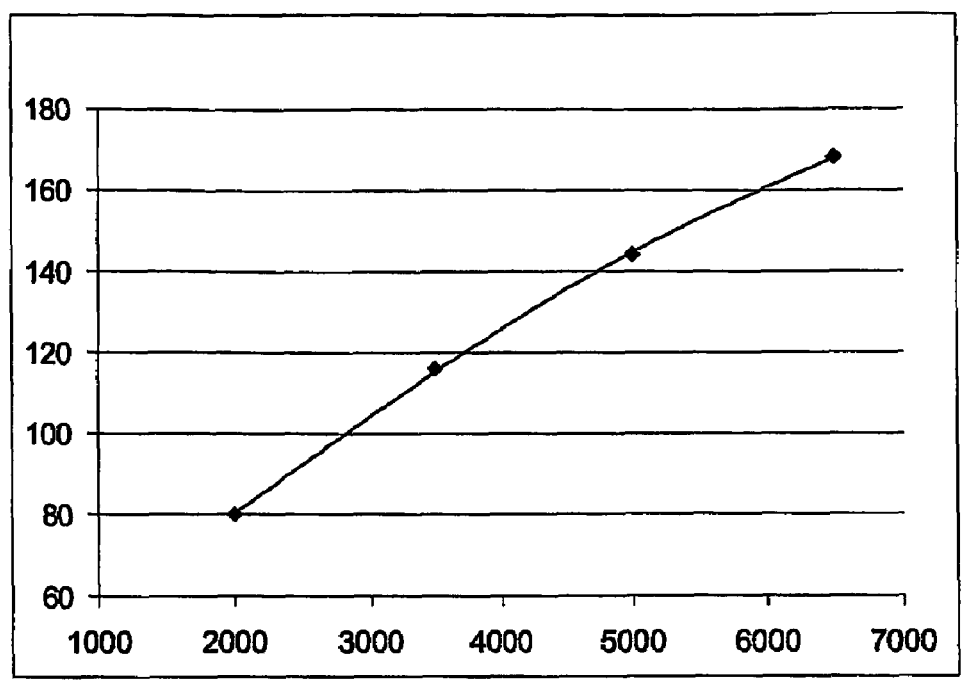
FIG. 10 shows a different function interpolating the same experimental data of FIG. 9.

On the other hand, FIG. 10 shows that a monotonic concave downwards function perfectly fits the experimental data in a plot of central contact length versus tyre load. In other words, a monotonic concave upwards function has to be used for calculating the tyre load from the contact patch length measured at the equatorial plane of the tyre, in order to minimize tyre load estimation errors. The Applicant has found that this result can be applied to any kind of vehicle tyre, e.g. car tyres, truck tyres, SUV tyres etc. The exact mathematical form of the concave upwards fitting function $F_z=F_z(PL_c)$ may depend on the internal and/or geometrical structure of the tyre. However, the general trend of the function to be used for the calculation is that explained above. The "concave upwards" general trend should be verified for typical values of contact patch length of interest, i.e. In a range between 60 mm and 200 mm for car tyres, between 150 mm and 450 mm for truck tyres, between 100 mm and 270 mm for SUV tyres.

For example, the Applicant has found that $PL_C$ and $F_Z$ can be related by a polynomial fit function having a degree two, such as the following:

$$PL_c = A \cdot F_z^2 + B \cdot F_z + C \quad (1)$$

where A, B and C are fit coefficients. Such fit coefficients depend on the tyre structure and can be obtained by a characterization of the tyre. In the characterization, different vertical loads may be applied to the tyre and the length of the contact region between said tyre and said rolling surface can be measured at the equatorial plane. Equation (1) can be inverted in order to derive the tyre load:

$$F_z = \frac{-B + \sqrt{B^2 - 4A(C - PL_c)}}{2A}, \quad (1')$$

As another example, a tangent function may be adapted for fitting the data:

$$F_z = A1 \tan(B1 \cdot PL_c) \quad (2)$$

where A1 and B1 are fit coefficients. Anyway, the skilled in the art may find other suitable functions describing the relationship between the tyre load $F_z$ and the central contact patch length $PL_c$, having the general trend disclosed above. Typical functions that can be adapted may be polynomial functions having degree at least two.

Figure 11:
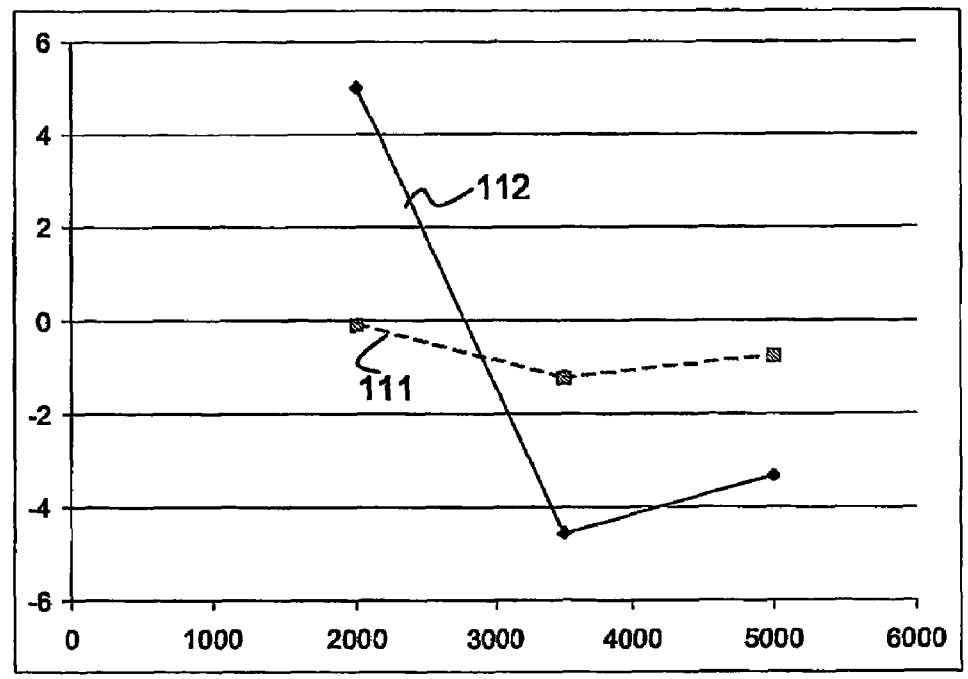
FIG. 11 shows how values obtained by the interpolating functions shown in FIGS. 9 and 10 deviate from the experimental data.

In FIG. 11, the percentage difference between the actual tyre load and the tyre load calculated with the fit function (1') has been plotted (plot 111), versus the tyre load: as it can be seen, a difference lower than 1% can be obtained. In the same graph, the percentage difference between the actual tyre load and the tyre load calculated by a fitting straight line has been plotted (plot 112). It is immediately realized that fitting the experimental data by a straight line may result in a difference up to about 5% with respect to the actual tyre load value. Such an error in the tyre load estimation could become unacceptable, in particular when the tyre is subjected to high loads (e.g., an external tyre during a cornering manoeuvre).

Thus, during the running of a vehicle, the patch length of the tyre/s of which it is desirable to know the corresponding vertical load is measured approximately at the equatorial plane of the tyre/s. The corresponding real time value of vertical load acting on said tyre/s is therefore easily calculated as a function of the central contact patch length.

The above described function and/or the fit coefficients for calculation of the tyre load can be stored within the memory of the fixed unit 2 or of the sensor device 3, in order to be used by the associated processing unit.

The Applicant believes that the fit coefficients do not vary considerably according to the tyre pressure, at least in a range around the nominal value, defined by the vehicle and tyre manufacturers. In any case, for a more complete and exhaustive tyre characterization, the same tests described herein for a pressure equal, or very close, to the nominal one could be performed at different pressure values in order to find a corresponding set of fit coefficients related to such pressure values.

The real-time determination of the load acting on a tyre mounted on a vehicle is an important parameter that can be passed to a vehicle control system, in order to control the behavior of the vehicle, particularly in critical conditions. A vehicle control system may comprise a brake controller (for example, an anti-lock brake unit), and/or a steering controller, and/or a suspension controller, and/or an engine controller, and/or a transmission controller.

For example, a vehicle brake control system may adjust the braking force on each tyre according to the load on the tyre.

As another example, the loads on each tyre may be used to determine the vehicle stability envelope and to select the maximum variation allowed from steering commands. This information may be applicable to a steering control system (Electrically Assisted Steering Systems) to limit the yaw rate.

As another example, a vehicle suspension control system may adjust the stiffness of the suspension springs for each tyre according to the load on the tyre. Furthermore, a sensed unequal load distribution between left fitted tyres and right fitted tyres could be compensated by an Active Roll Control system, that currently use sensed lateral acceleration to increase the hydraulic pressure to move stabilizer bars, in order to remove a vehicle lean when cornering.

The conditions of the vehicle may indicate that the performance of the vehicle is reduced and that the driver should restrict his driving maneuvers. The vehicle control system itself can take action, for example in order to limit the maximum vehicle speed to maintain stability and not exceed the tyre specifications, or to limit steering yaw rate in order to keep rollovers from occurring. The driver may be alerted to the current vehicle control system condition and of the actions that the vehicle control system has taken on his behalf to safe the vehicle (reducing the maximum attainable speed, steering rate, engine power), as needed on a display device. On the same display device it may also be shown whether he should take further action on his own (change the distribution of mass, restrict driving maneuvers and speed). The display device may comprise a visual and/or an audible unit, for example located in the dashboard of the vehicle.

There have thus been shown and described a novel system and a novel method which fulfil all the objects and advantages sought therefore. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

The invention claimed is:

1. A method for determining a load exerted on a tyre fitted on a vehicle during running of said vehicle on a rolling surface, the tyre comprising an equatorial plane, comprising the steps
providing a concave upward function $F_z=F_z(PL_c)$ of said tyre load versus a length of a contact region between said tyre and said rolling surface;
estimating said length ($PL_c$) substantially at the equatorial plane; and
deriving the tyre load corresponding to said estimated length from said function.

2. The method according to claim 1, wherein said function is a polynomial function of degree at least two of said length.

3. The method according to claim 1, wherein said function is $$F_z = \frac{-B + \sqrt{B^2 - 4A(C - PL_c)}}{2A}$$

wherein A, B and C are fit coefficients related to a structure of said tyre.

4. The method according to claim 1, wherein said function is $F_z=A1 \cdot \tan(B1 \cdot PL_c)$, wherein A1 and B1 are fit coefficients related to a structure of said tyre.

5. The method according to claim 1, wherein said step of estimating said length ($PL_c$) comprises the step of acquiring an acceleration signal.

6. The method according to claim 5, further comprising the step of low-pass filtering said acceleration signal.

7. The method according to claim 5, wherein said step of acquiring an acceleration signal comprises acquiring a tangential acceleration signal.

8. The method according to claim 7, wherein the step of estimating said length comprises measuring a distance between a maximum value and a minimum value of said tangential acceleration signal.

9. The method according to claim 5, wherein said step of acquiring an acceleration signal comprises acquiring a radial acceleration signal.

10. The method according to claim 7, wherein the step of estimating said length comprises measuring a distance between two maxima of said radial acceleration signal.

11. A method of controlling a vehicle having at least one tyre fitted thereon, comprising:
estimating a load exerted on said tyre by a method according to claim 1;
passing said estimated load to a vehicle control system of the vehicle; and
adjusting at least one parameter in said vehicle control system based on said estimated load.

12. The method according to claim 11, wherein said vehicle control system comprises a brake control system, and said step of adjusting at least one parameter comprises adjusting a braking force on said tyre.

13. The method according to claim 11, wherein said vehicle control system comprises a steering control system, and said step of adjusting at least one parameter comprises selecting a maximum variation allowed from steering commands.

14. The method according to claim 11, wherein said vehicle control system comprises a suspension control system, and said step of adjusting at least one parameter comprises adjusting a stiffness of a suspension spring associated with said tyre.

15. The method according to claim 11, wherein said vehicle comprises at least one tyre fitted on its right and at least one tyre fitted on its left, said vehicle control system comprising an active roll control system, and said step of adjusting at least one parameter comprising compensating an unequal load distribution between said left fitted tyre and said right fitted tyre.

16. A system for determining a load exerted on a tyre fitted on a vehicle during running of said vehicle on a rolling surface, comprising:
a measuring device adapted to estimate a length ($PL_c$) of a contact region between said tyre and said rolling surface substantially at the equatorial plane; and
at least one processing unit adapted to derive the tyre load corresponding to said estimated length from a concave upward function $F_z=F_z(PL_c)$ of said tyre load versus the length of contact region between said tyre and said roiling surface.

17. The system according to claim 16, wherein said function is a polynomial function of degree at least two of said length.

18. The system according to claim 16, wherein said function is $$F_z = \frac{-B + \sqrt{B^2 - 4A(C - PL_c)}}{2A},$$

wherein A, B and C are fit coefficients related to the structure of said tyre.

19. The system according to claim 16, wherein said function is $F_z=A1 \cdot \tan(B1 \cdot PL_c)$, wherein A1 and B1 are fit coefficients related to a structure of said tyre.

20. The system according to claim 16, wherein said measuring device comprises a tangential or a radial accelerometer producing a corresponding acceleration signal.

21. The system according to claim 20, wherein said measuring device comprises a sampling device adapted to sample said signal at a frequency of at least 5 kHz.

22. The system according to claim 21, wherein said sampling device is adapted to sample said signal at a frequency of at least 7 kHz.

23. The system according to claim 16, further comprising at least one memory associated with said processing unit.

24. The system according to claim 23, wherein said at least one memory comprises pre-stored characteristic functions describing vertical tyre loads versus contact region lengths.

25. The system according to claim 23, wherein said at least one memory comprises pre-stored instructions for said processing unit.

26. The system according to claims 16, wherein said measuring device is included in a sensor device located in a tread area portion of said tyre.

27. The system according to claim 26, wherein said sensor device is secured to an inner liner of the tyre.

28. The system according to claim 27, comprising a damping element between said sensor and said inner liner.

29. The system according to of claim 25, wherein said sensor device further comprises a transmitting device.

30. The system according to claim 29, wherein said transmitting device is operatively connected to a first antenna.

31. The system according to claim 20, further comprising a filtering device adapted for low-pass filtering said signals.

32. The system according to claim 26, wherein said sensor further comprises a power source.

33. The system according to claim 32, wherein said power source comprises a battery.

34. The system according to claim 32, wherein said power source comprises a self-powering device adapted to generate electrical power as a result of mechanical stresses undergone by said sensor device during running of said vehicle.

35. The system according to claim 34, wherein said self-powering device comprises a piezoelectric element.

36. The system according to claim 34, wherein said self-powering device comprises an electrical storage circuit.

37. The system according to claim 36, wherein said electrical storage circuit comprises a resistor and a capacitor.

38. The system according to claim 26, wherein said processing unit is included within said sensor device.

* * * * *

UNITED STATES PATENT AND TRADEMARK OFFICE
CERTIFICATE OF CORRECTION

PATENT NO.         : 7,404,317 B2
APPLICATION NO. : 10/576604
DATED              : July 29, 2008
INVENTOR(S)        : Mancosu et al.

Page 1 of 1

It is certified that error appears in the above-identified patent and that said Letters Patent is hereby corrected as shown below:

Claim 4, column 13, line 51, "$F_2=A1·\tan(B1·PL_c)$," should read --$F_z=A1·\tan(B1·PL_c)$,--.

Claim 16, column 14, lines 44-45, "roiling" should read --rolling--.

Claim 26, column 15, line 13, "claims" should read --claim--.

Claim 29, column 15, line 20, "to of claim" should read --to claim--.

Signed and Sealed this

Eighteenth Day of November, 2008

JON W. DUDAS
*Director of the United States Patent and Trademark Office*